(12) United States Patent
Urella (10) Patent No.: US 12,086,941 B2
(45) Date of Patent: Sep. 10, 2024

(54) SURFACE PARTITION WITH PLANE AND LINE CONSTRAINTS

(71) Applicant: STREEM, LLC, Portland, OR (US)

(72) Inventor: Nikilesh Urella, Portland, OR (US)

( * ) Notice: Subject to any disclaimer, the term of this patent is extended or adjusted under 35 U.S.C. 154(b) by 50 days.

(21) Appl. No.: 17/897,683

(22) Filed: Aug. 29, 2022

(65) Prior Publication Data

US 2024/0070985 A1    Feb. 29, 2024

(51) Int. Cl.
*G06T 17/20* (2006.01)
*G06F 3/01* (2006.01)
*G06F 3/0346* (2013.01)
*G06T 7/10* (2017.01)

(52) U.S. Cl.
CPC ............ *G06T 17/205* (2013.01); *G06F 3/011* (2013.01); *G06F 3/016* (2013.01); *G06F 3/0346* (2013.01); *G06T 7/10* (2017.01); *G06T 2210/21* (2013.01)

(58) Field of Classification Search
CPC ..... G06T 17/205; G06T 7/10; G06T 2210/21; G06T 2210/04; G06T 2210/61; G06F 3/011; G06F 3/016; G06F 3/0346
See application file for complete search history.

(56) References Cited

U.S. PATENT DOCUMENTS

| 7,224,356 B2 * | 5/2007 | Zhou ...................... G06T 17/20 345/419 |
| 10,573,060 B1 * | 2/2020 | Ascolese ................. A63F 13/52 |
| 2005/0270285 A1 * | 12/2005 | Zhou ...................... G06T 17/20 345/420 |
| 2023/0074094 A1 * | 3/2023 | Hertzmann ............. G06T 17/20 |
| 2023/0275100 A1 * | 8/2023 | Chien ................. H01L 27/1244 257/72 |
| 2023/0275117 A1 * | 8/2023 | Lin ..................... H01L 33/0095 257/89 |

OTHER PUBLICATIONS

Y. Cai, X. Guo, Y. Liu, W. Wang, W. Mao and Z. Zhong, "Surface Approximation via Asymptotic Optimal Geometric Partition," in IEEE Transactions on Visualization and Computer Graphics, vol. 23, No. 12, pp. 2613-2626, Dec. 1, 2017, doi: 10.1109/TVCG.2016.2623779.

* cited by examiner

*Primary Examiner* — Vijay Shankar (57) ABSTRACT

Embodiments herein may relate to a technique to be performed by surface partition logic. The technique may include identifying a first mesh portion that is related to a first plane of a three-dimensional (3D) space, and a second mesh portion that is related to a second plane of the 3D space. The technique may include identifying, based on a linear representation of a border between the first mesh portion and the second mesh portion, an element of the first mesh portion that at least partially overlaps the second mesh portion. The technique may further include altering the element of the first mesh portion to reduce the amount that the element overlaps the second mesh portion. Other embodiments may be described and/or claimed.

18 Claims, 11 Drawing Sheets

SURFACE PARTITION WITH PLANE AND LINE CONSTRAINTS

BACKGROUND

Legacy systems may be able to scan a room and present information regarding the environment to a user. However, in many legacy systems, such a scan may have limited information or value for understanding the contents of the room. Specifically, indoor environment reconstructions may include several planar regions like walls, corners, edges, etc. Legacy planar partition algorithms may be based on geometry curvature (e.g., separating planar regions based on non-linearity or non-planarity). However, due to sensor noise and/or three-dimensional (3D) reconstruction algorithms, the sharpness of the geometry at edges or corners may be smoothed out. As used herein, the phrase "smoothed out" refers to reduced "sharpness" of the geometry of a 3D space while generating a mesh representation of the 3D space. As a result, partitioned planar regions on smoothed-out curvature regions may appear to be inconsistent along edges of the 3D reconstruction.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As communications technology continues to advance, modern systems can additionally capture and/or transmit spatial data associated with video and audio being captured and transmitted. Alternatively or additionally, systems can derive spatial data using various photogrammetric techniques, through which three-dimensional spatial relationships can be ascertained. Depending upon the capabilities of a capturing device, depth data may be directly measured or calculated on the fly from captured video, possibly in conjunction with spatial position sensors that may be equipped to the capturing device. For example, most modern smartphones are equipped with an array of sensors beyond cameras and microphones; a modern smartphone may also include depth sensing, such as a LiDAR imager or rangefinder, and motion sensing, such as multi-axis gyroscopes and accelerometers. Combined with image analysis and photogrammetry techniques, as well as techniques such as simultaneous localization and mapping (SLAM) that allow integration of depth and motion data to enable a device to both measure its environment and know its position within the environment, these array of sensors allow for the relatively accurate capture and/or calculation of depth information for a captured scene.

This depth information can be used to construct a mesh, essentially by "connecting the dots", viz. repeatedly connecting sets of three depth points together with edges to form a mesh of triangles that approximates the 3D space from which the depth information was obtained. More generally, the depth information may be used to form the 3D mesh by integrating depth information into a 3D volume. The mesh may then be extracted from the volume as a plurality of triangles that may represent the 3D space. As used herein, the term "3D space" or "3D location" may be used to represent a physical location at which the scan is being performed (e.g., a room, a hallway, an open area, etc.)

The depth information may be obtained by using a suitably equipped device to scan or capture the 3D space; this may be accomplished by panning and/or moving the device with its video camera and any depth scanning sensors active so that the video camera and sensors capture a view (e.g., up to a 360 degree view) of the space.

As noted previously, due to sensor noise and/or three-dimensional (3D) reconstruction algorithms, the sharpness of the geometry at edges or corners of the 3D space may be smoothed out. As a result, partitioned planar regions on smoothed-out curvature regions may appear to be inconsistent along edges of the 3D reconstruction. However, because the position of the capturing device within the 3D space can be known relative to the depth data and determined with respect to each successive frame of video simultaneously captured by the device, comparisons may be made between the depth data and the images taken by the camera. As a result, embodiments herein relate to a technique by which a 3D mesh that is based on camera poses and images is partitioned into multiple planar regions based on the curvature of the mesh and two-dimensional (2D) line segments of the camera images.

More specifically, embodiments may relate to a mechanism by which planar regions may be identified with consistent borders by using both 3D and 2D information of or related to a 3D mesh. The technique may relate to identifying planar regions and line segments in 2D images. The borders of the planar regions may then be refined using the 2D line segments.

Figure 1:
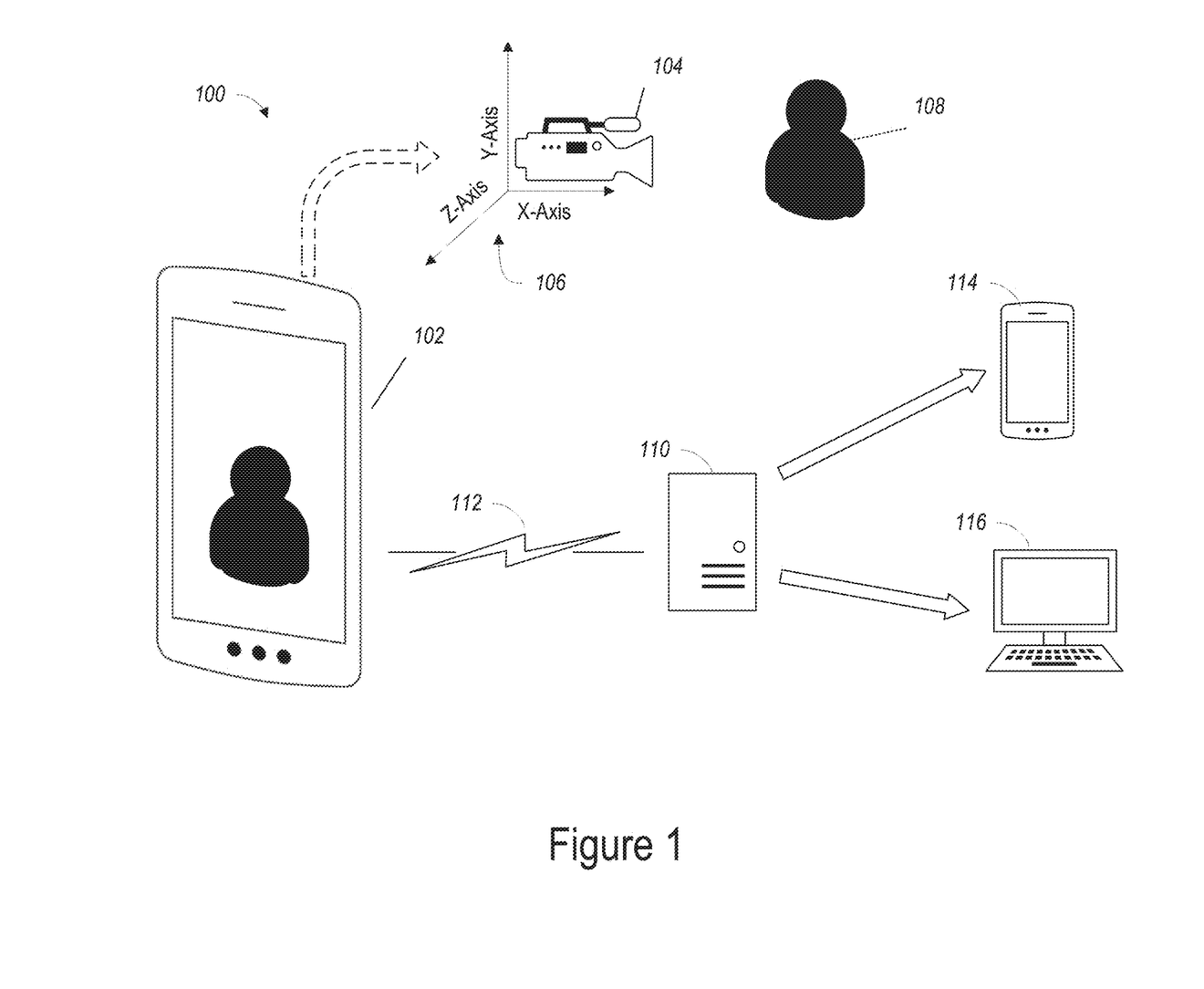
FIG. 1 illustrates a block diagram of the components of a system for capturing an image and corresponding 3D data, according to various embodiments.

FIG. 1 illustrates an example system 100 that may enable capture of an image or video that includes spatial data. System 100 may include a user device 102. In the depicted embodiment of FIG. 1, user device 102 is a smartphone, which may be implemented as a computer device 1000, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. User device 102 further may include a camera 104 and a spatial position sensor 106 (depicted by a series of axes), which provides information about the spatial position of camera 104. It will be understood that camera 104 and spatial position sensor 106 may be contained within the body of device 102. Camera 104 is used to capture the surrounding environment of device 102, and by extension, the user. The environment may be a 3D space such as a room, and may include one or more three-dimensional objects 108.

Camera 104 may be any camera that can provide a suitable video stream for the intended purpose of user device 102. Where user device 102 is implemented as a smartphone or tablet, camera 104 may be one or more built-in cameras. In other embodiments, such as where consumer device is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and user device 102. In other embodiments, camera 104 of user device 102 may comprise multiple cameras or similar sensors, where one or more of the sensors may be configured to directly detect depth points, such as a 3D camera, LIDAR, or other suitable depth-sensing technology. In such embodiments, a point cloud of any space captured by camera 104 may be able to be at least partially obtained via direct measurement from the depth-sensing technology.

Spatial position sensor 106 may be configured to provide positional information about camera 104, such as the camera 104's location, the direction that the camera 104 is facing, and/or an orientation of the camera 104. The positional information of the camera may be referred to herein as the camera 104's "pose." Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

System 100 also includes a central server 110, with which user device 102 is in data communication 112. Central server 110 may act to receive information from user device 102 such as video and depth data, which may be used with process flow 200, discussed below. In some embodiments, user device 102 may handle processing of video and depth information for a captured 3D space, including generation of a metaverse, 3D mesh, and/or layout and estimation of measurements. However, depending upon the specifics of a given implementation, central server 110 may instead carry out some or all processing of the video and depth data to generate a spatial layout and estimation of dimensions of a 3D space captured by the user device 102. User device 102 may either handle a part of the processing, or simply act to acquire data about a 3D space and providing raw or partially processed data to central server 110 for further processing.

Also shown in system 100 are one or more additional user devices 114, 116, which may be smartphones, tablets, laptops, desktops, or other servers. These additional user devices 114, 116 may also be in data communication with central server 110, and so may receive raw or processed data captured by user device 102 and/or a completed layout and estimation of measurements of the 3D space captured by user device 102. User devices 114 and/or 116 may be capable of interaction with the layout and estimations, as well as a generated 3D mesh or metaverse, received from central server 110. Further still, user devices 114, 116 may be enabled to engage in two-way or multi-way interaction with user device 102 through central server 110, with each device commonly working with a generated 3D mesh, metaverse, 2D or 3D layout, and/or estimates of spatial dimensions of the metaverse. It should be understood that devices 114 and 116 are merely examples, and are not indicative of the number or type of devices connected to central server 110; a given implementation may have an arbitrary number of devices connected to central server 110.

User device 102, as mentioned above, is in data communication 112 with central server 110, along with user devices 114 and 116. Data communication 112 may be implemented using any suitable data communication link technology, which may be wired, wireless, or a combination of both. Example communications technologies are discussed below with respect to FIG. 10.

Figure 2:
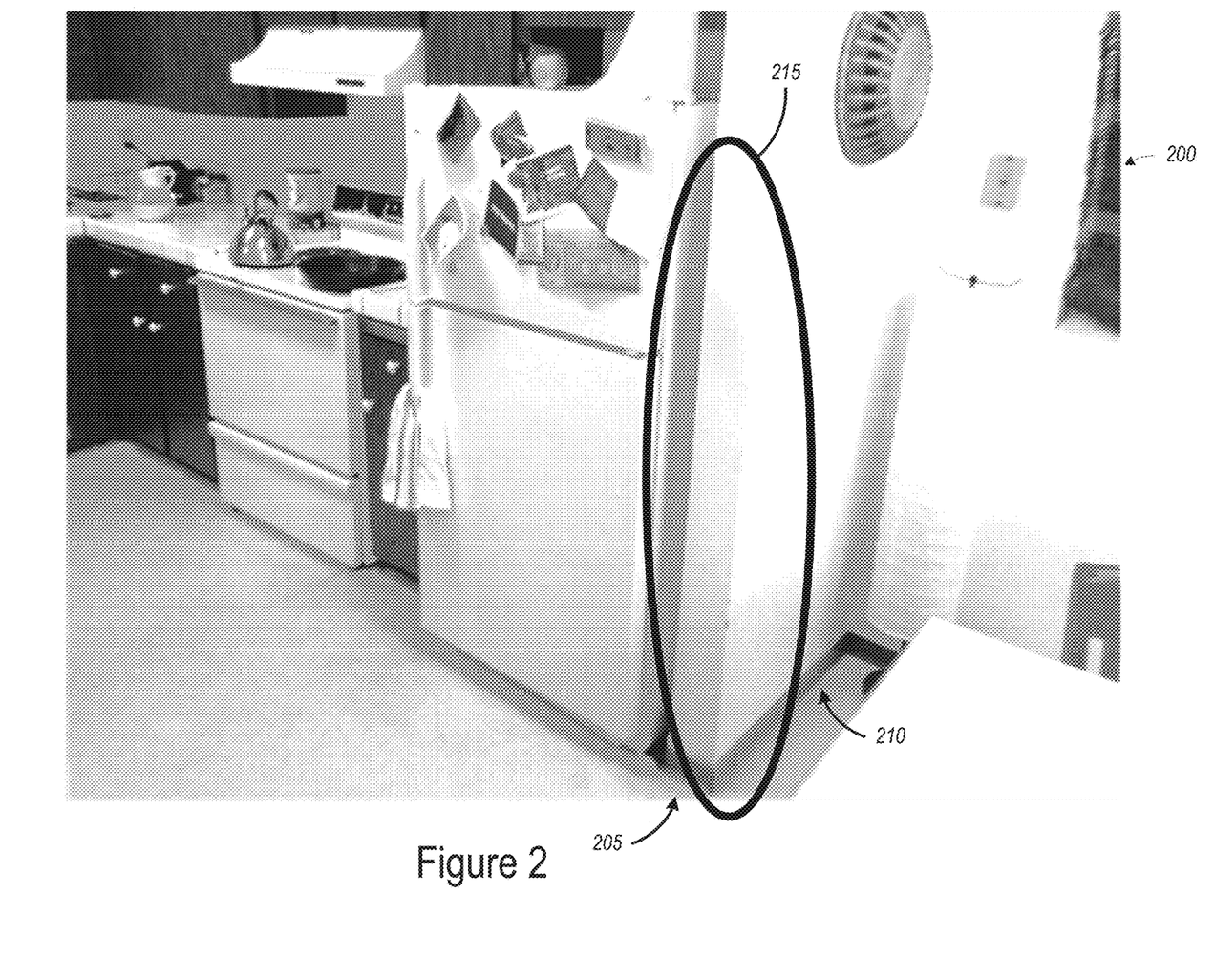
FIG. 2 depicts an example image of a 3D space, according to various embodiments.

FIG. 2 depicts an example image 200 that may be captured by a camera such as camera 104. As may be seen in the example image 200, the 3D space may include a number of scenes (e.g., the face of the refrigerator, the face of the stove, the various cabinets, the countertop, etc.). For the sake of discussion herein, description of embodiments will be made with respect to the portion 215 of the image 200. As may be seen, the portion 215 may include two planar surfaces, 205 and 210. By way of description and context, and not by way of limitation, it may be noted that planar surface 205 may generally correspond to the portion of the wall adjacent to the refrigerator in image 200, and planar surface 210 may generally correspond to the portion of the wall that is orthogonal to planar surface 205.

It will be noted that the image 200 of FIG. 2 is presented in this document as a grayscale image. However, it will also be understood that such an image may be presented according to another color-based scheme such as red-green-blue (RGB), cyan-magenta-yellow-key (CMYK), or some other type of color scheme.

Figure 3:
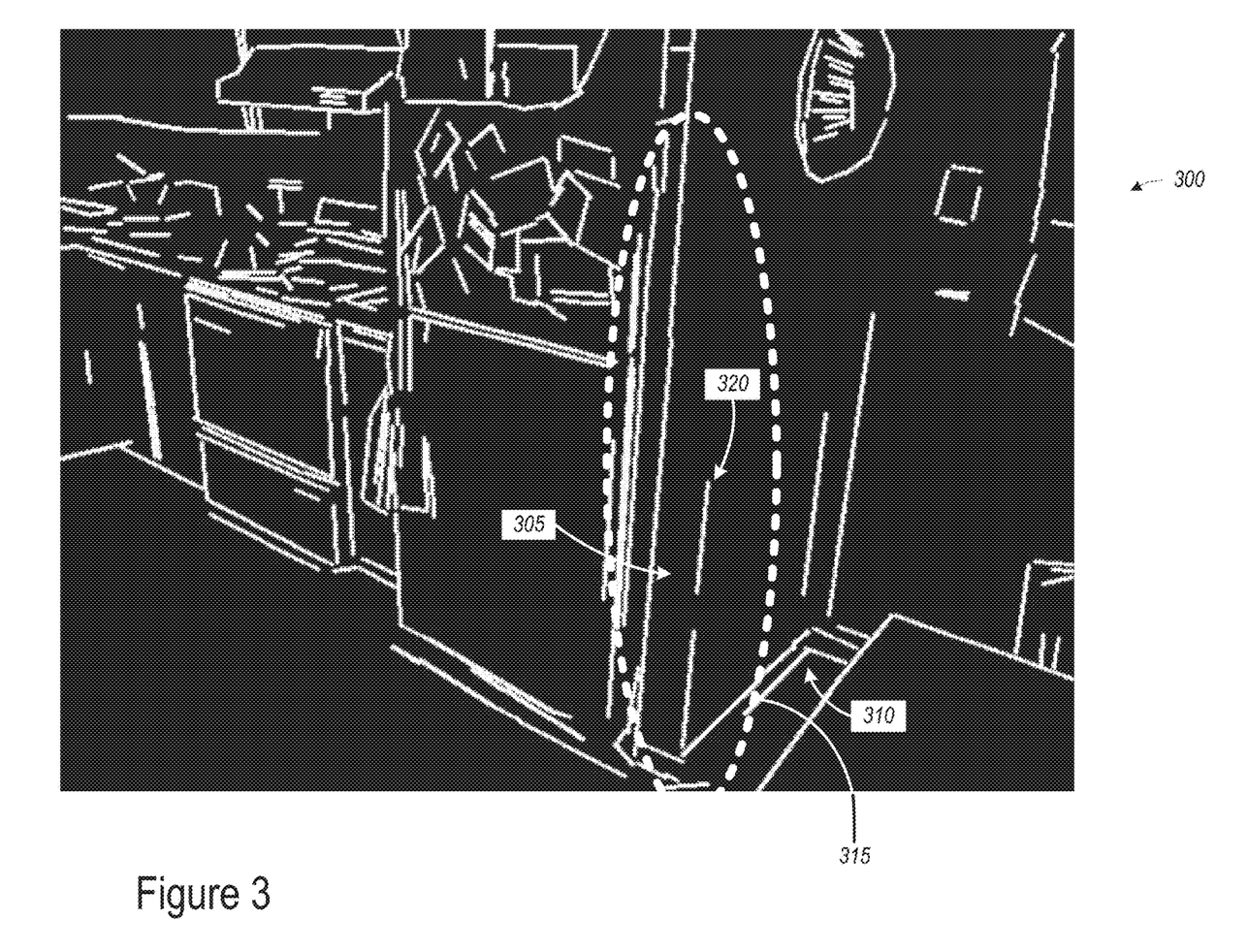
FIG. 3 depicts an alternative example image of a 3D space, according to various embodiments.

FIG. 3 depicts an alternative example image 300 of a 3D space, according to various embodiments. Specifically, this image 300 may relate to a "line" based representation of the 3D space. In some embodiments, the various lines may be based on depth-related information provided by the camera. For example, lines may be identified based on changes in depth variation of a planar surface (e.g., "peaks" or "valleys") detected by the software. In other embodiments, the various lines may be based on one or more of the images produced by the camera (e.g., image 200 of FIG. 2). For example, the various lines of FIG. 3 may be identified based on changes to brightness, contrast, chromatic value, shading, color, or some other factor of an image such as image 100

As may be seen in the portion 315 of the image 300 of FIG. 3, two planar surfaces 305 and 310 may be seen in the image 300. It will be noted that planar surface 305 may correspond to planar surface 205, and planar surface 310 may correspond to planar surface 210.

The planar surfaces 305/310 may be separated by a line 320. As shown in FIG. 3, the line 320 may only partially correspond to the separation between the two planar surfaces 305/310. This may be because the software that is designed to generate the image 300 may have a "threshold" value upon which the various lines of the image 300 are based. For example, a line may only be generated if there is a change in an image parameter of an image such as image 100 that is above a given threshold. For example, if a change in brightness, contrast, color, etc. is above a pre-defined, dynamic, or user-defined threshold, then a line may be generated. In other embodiments, a line such as line 320 may only be generated if there is a change in a depth variation of a planar surface (e.g., a "peak" or a valley") that is greater than a given threshold. Such a threshold may be a pre-identified threshold, dynamic (e.g., based on similar values in surrounding region(s)), or it may be user-defined.

Figure 4:
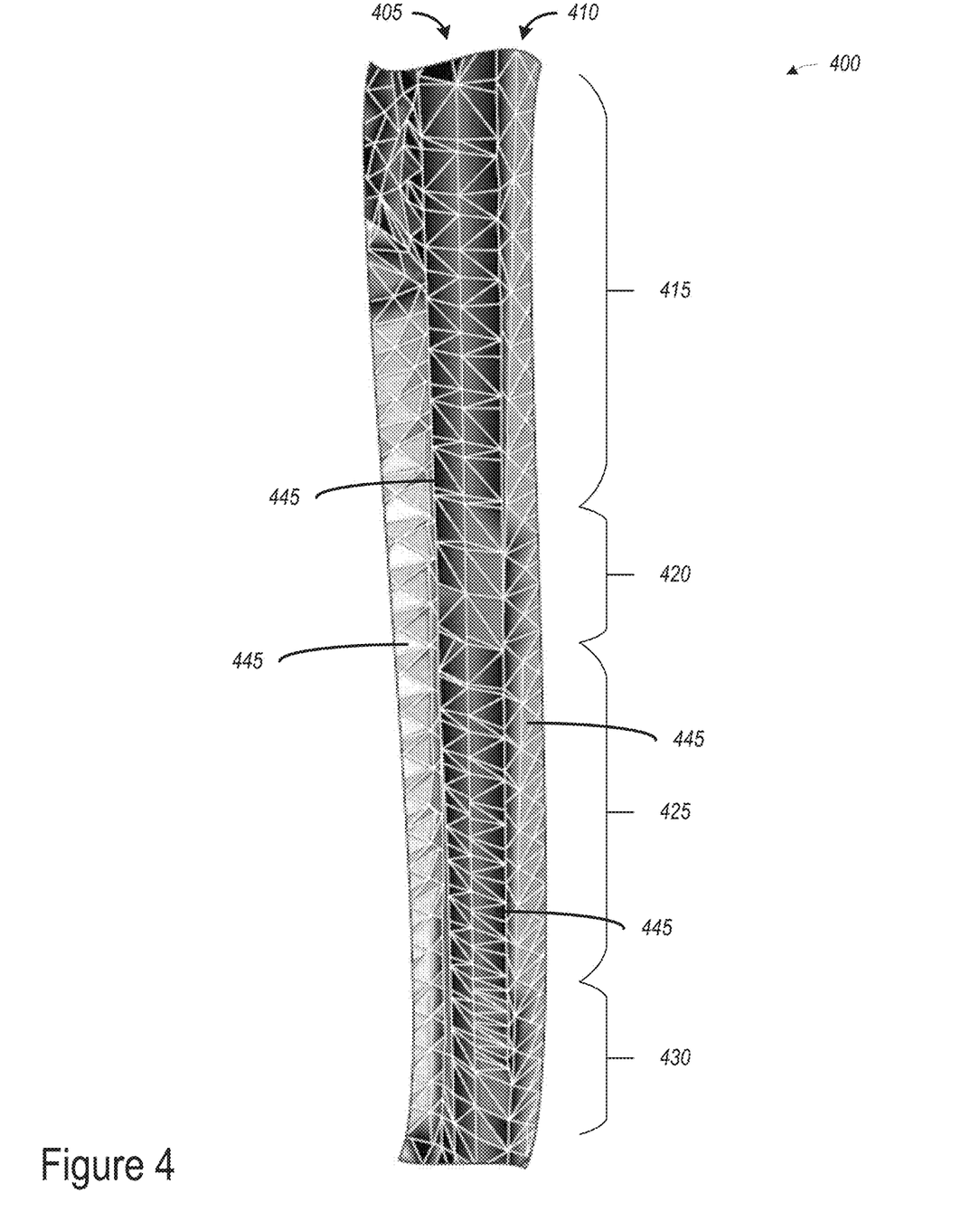
FIG. 4 depicts an example image of a 3D mesh related to the 3D space, according to various embodiments.

FIG. 4 depicts an example image 400 of a 3D space related to the 3D space, according to various embodiments. It will be noted that the 3D mesh depicted in image 400 is only a portion of an overall 3D mesh that would be related to a 3D space such as the space depicted in image 200. For the sake of discussion and description of embodiments herein, the 3D mesh depicted will generally correspond to the portion 215/315 of the 3D space described above. More specifically, the 3D mesh may include two planar surfaces 405 and 410, which may generally correspond to planar surfaces 205/305 and 210/310, respectively.

It will be noted that the 3D mesh may be generated in accordance with various techniques. For example, in some embodiments the 3D mesh of image 400 may be generated based on the captured depth information as described above with respect to FIG. 2. So as one example for the sake of discussion, respective images taken by the camera may have various visual information (e.g., RGB values, brightness, contrast, etc.), depth-related information, and information related to the pose/orientation/location of the camera. The captured depth information may be used to generate the 3D mesh of image 400 through the use of various 3D reconstruction techniques such as voxel hashing or some other technique.

As previously described, due to sensor noise and/or three-dimensional (3D) reconstruction algorithms, the sharpness of the geometry at edges or corners may be smoothed out. As a result, "corners," or the separation between two planar surfaces of the 3D mesh, may be ill-defined or "smoothed out" as shown in FIG. 4. As such, such corners may be less well defined in the resultant 3D mesh. Specifically, in FIG. 4 different shading of different elements 445 of the 3D mesh 400 may indicate increased smoothing of that element 445, resulting in a less sharp definition of the corner.

More specifically, as can be seen at portions 415 and 425 of the 3D mesh 400, certain elements 445 of the planar surface 405 that are adjacent to planar surface 410 have a dark shading, which may indicate a higher level of smoothing. Similarly, some elements of planar surface 410 that are adjacent to planar surface 405 in portions 415 and 425 have a darker shading as well.

By contrast, as can be seen at portions 420 and 430 of the 3D mesh, several elements 445 of the planar surface 410 that are adjacent, or even non-adjacent, to planar surface 405 have a darker shading, indicating an increased level of smoothing rather than a "sharp" or well-defined corner.

More generally, it may be noted that the shading of various parts of the planar surfaces 405/410 may be inconsistent. That is, the shading may vary at different parts of the planar surfaces 405/410. This variation may indicate varying levels of smoothing, as described above.

Figure 5:
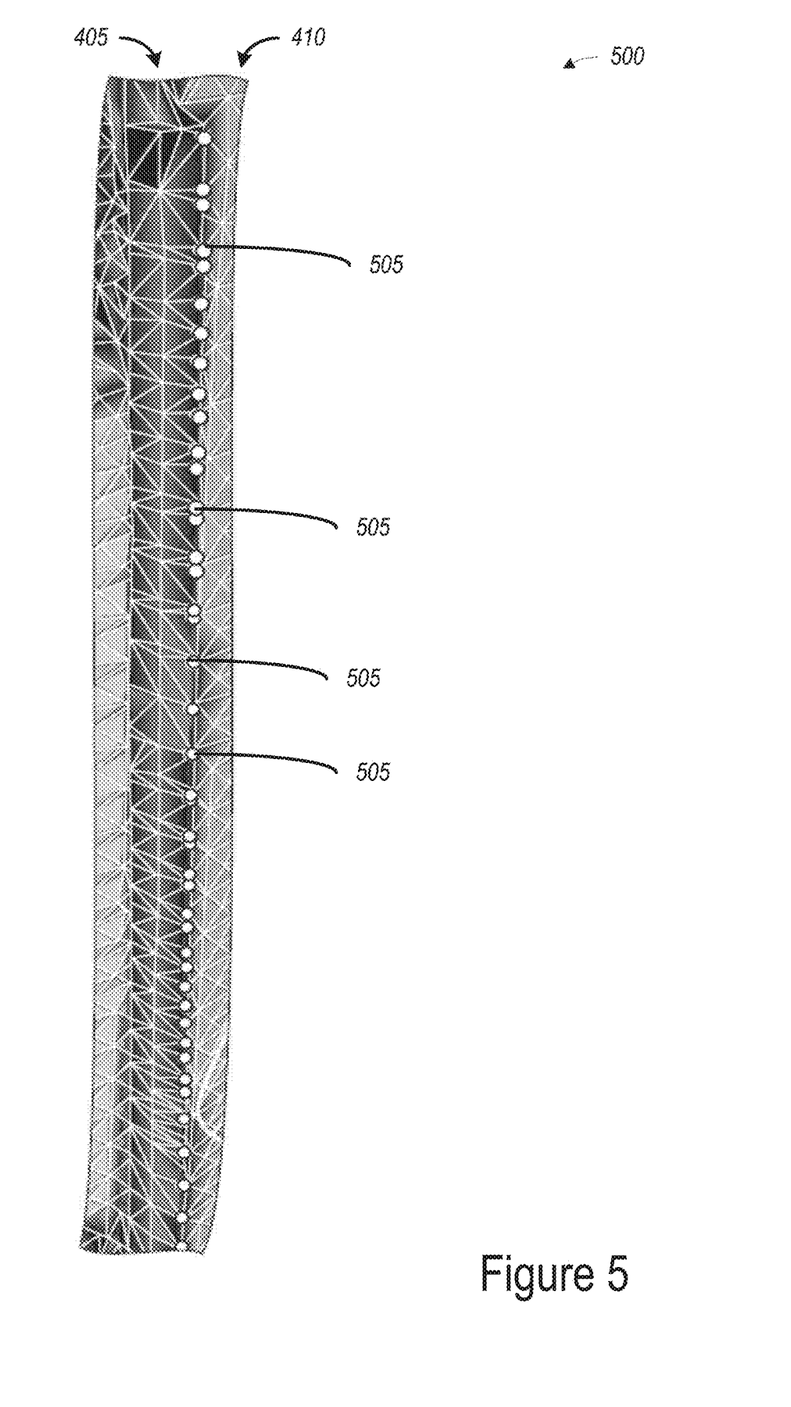
FIG. 5 depicts an alternative example image of the 3D mesh of FIG. 4, according to various embodiments.

FIG. 5 depicts an alternative example image 500 of the 3D mesh related to the 3D space, according to various embodiments. Specifically, the 3D mesh of image 500 may be the same as the 3D mesh of image 400. However, as may be seen in image 500, a generally linear series of dots 505 have been overlaid onto the 3D mesh.

The dots 505 may be based on lines such as line 320 of the image 300 of FIG. 3. Specifically, the image 500 may be an image that results from overlaying line 320 onto the 3D mesh 400 of FIG. 4. It will be noted that the dots 505 may form a linear pattern that is larger than line 320. In some embodiments, overlaying a line such as 320 onto a 3D mesh 400 may include extending one or more lines of the image of FIG. 3. Such extension may be performed, for example, through computer-aided analysis that identifies one or more incomplete lines and automatically extends such lines. The analysis and identification may be based on a comparison of the image 300 of FIG. 3 to the 3D mesh 400, the image 200 of FIG. 2, or some other type of analysis and/or comparison. In some embodiments the extension may be performed by a user of the computing device. For example, an operator may compare the image 300 against the image 200, identify incomplete lines, and manually extend one or more lines such as line 320. Other embodiments may include or relate to additional or alternative techniques.

Overlaying the line 320 onto the 3D mesh 400 may likewise be performed through a variety of techniques. One such technique may be as follows. Given a 3D mesh such as 3D mesh 400, the initial planar clusters obtained from surface partition logic may identify corner vertices and/or triangles of the 3D mesh. For example, the surface partition logic may identify the corner vertices and/or triangles based on the different planar surfaces 405/410. As used in this context, a "corner" or "border" may refer a part of the 3D mesh 400 where two planar surfaces (e.g., planar surfaces 405/410) meet. A corner vertex or triangle may refer to a specific element of the 3D mesh 400 that is located at such a corner.

As will be recognized, because the planar surfaces 405/410 are representations of planar surfaces 205/210 or 305/310, the corners or separations between the two planar surfaces in each image may align with one another. In other words, the borders and/or corners of the 3D mesh 400 may be required to match with the borders/corners of the images 200 or 300.

Therefore, in order to identify which 3D border/corners from the 3D mesh 400 correspond to a line such as 320, the surface partition logic and/or an operator may project the 3D mesh planes, vertices, and/or triangles into two-dimensional (2D) space. After the 3D mesh 400 is projected into 2D space, the projected image may be compared to an image such as the image 300 such that a line of the image 300 (e.g., line 320) that corresponds to a border/corner of the 3D mesh 400 (e.g., the corner between planar surfaces 405 and 410) may be identified.

Such projection and identification may be accomplished through visual comparison (e.g., by an operator). In other embodiments, such projection and identification may be performed by one or more systems (e.g., the surface partition logic) that are able to identify the lines based on factors such as shape, colour, brightness, orientation, location within the image, etc. In other words, in some embodiments such identification may be automated. In embodiments where such identification is automated, then in some embodiments an operator may confirm the overlay.

The line that is identified as corresponding to the border (e.g., line 320) may then be projected back on the 3D mesh 400 at the appropriate border or corner. As shown in FIG. 5, the line may be projected onto the 3D mesh 400 as a series of white dots or pixels. In other embodiments, the line may be projected as some other representation.

Figure 6:
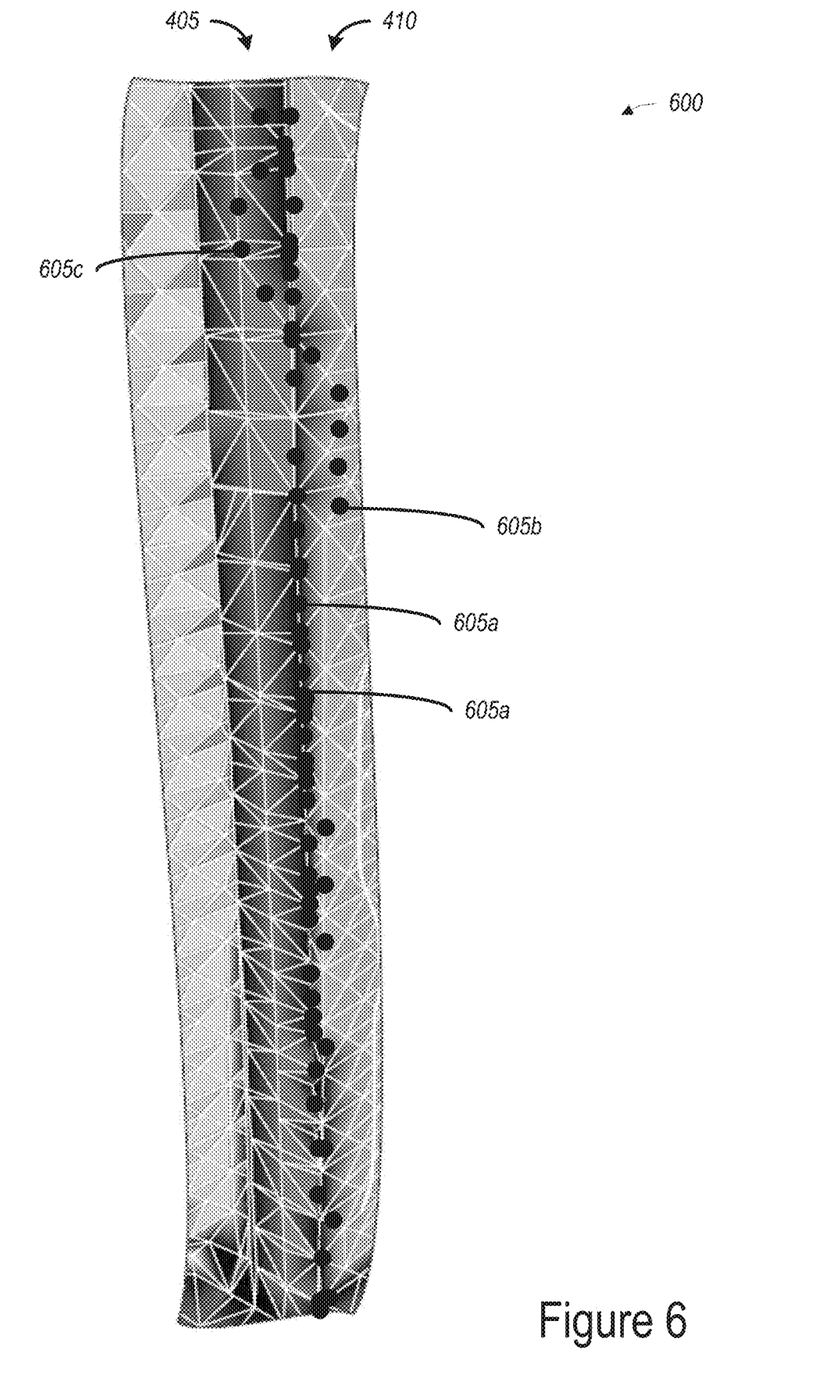
FIG. 6 depicts an alternative example image of the 3D mesh of FIG. 4, according to various embodiments.

FIG. 6 depicts an alternative example image 600 of the 3D mesh 400, according to various embodiments. Specifically, the image 600 depicts the 3D mesh 400 and planar surfaces 405 and 410. A series of dots 605a, 605b, and 605c (collectively, "dots 605") may be depicted overlaid onto the 3D mesh 400.

In embodiments, the dots 605 may represent new vertices that are identified based on the overlay of the line 320 onto the 3D mesh 400. Specifically, the surface partition logic may identify which triangles of the 3D mesh 400 have a portion of the line 320 and/or the dots 505 located therein or thereon. The triangles that are identified as having a portion of the line 320 and/or dots 505 located therein or thereon may be divided into multiple smaller triangles. The black dots 605 may represent new vertices that may be used for such division of the triangles of the 3D mesh 400.

Various techniques may be used for such division of triangles of the 3D mesh 400. One such technique, as shown in FIG. 6, may be division along the edges of the initial border or corner between planar surfaces 405 and 410. A new vertex (e.g., dot 605) may be placed at the midpoint of respective ones of the triangles of the 3D mesh, as shown in FIG. 6.

As a specific example, it may be noted that several of the dots 605a may be placed generally along the border between the two planar surfaces 405 and 410. Additionally, some dots 605c may be placed farther into a planar surface such as surface 405. These dots may correspond with relatively large triangles in planar surface 405 through which the dots 505 may run. Similarly, some dots 605b may be placed farther into a planar surface such as surface 410. These dots may similarly correspond to relatively large triangles in planar surface 410 through which dots 505 may run.

It will be noted that the above-described technique is intended as one example technique. In other embodiments, additional/alternative techniques may be used (e.g., the new vertices may be placed at a portion of the triangle that is not precisely the midpoint, triangles may be combined or replaced rather than strictly divided, etc.).

Figure 7:
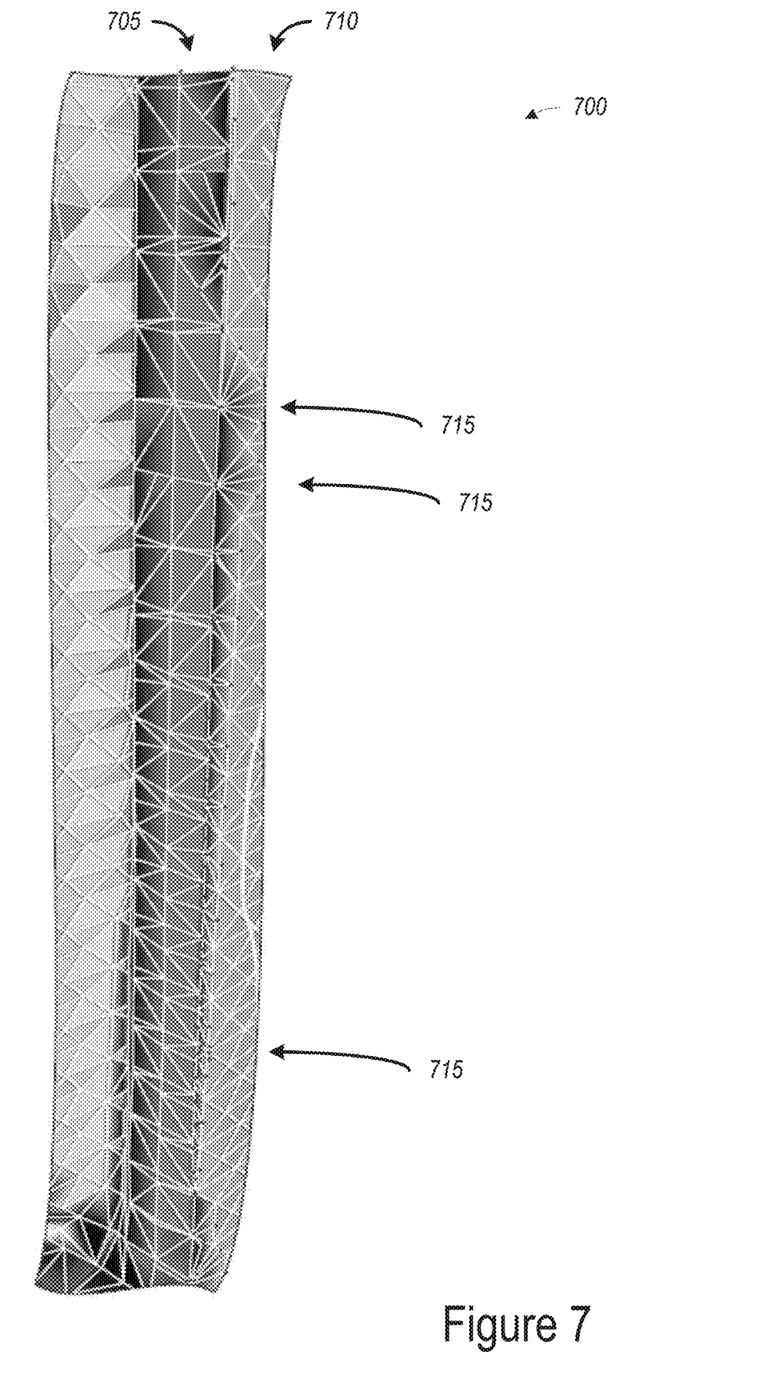
FIG. 7 depicts an alternative example image of a 3D mesh, according to various embodiments.

FIG. 7 depicts an alternative example image of a 3D mesh 700, according to various embodiments. The 3D mesh 700 may generally correspond to the 3D mesh 400 of FIG. 4, and include planar surfaces 705 and 710, which may correspond to planar surfaces 405 and 410. However, as may be seen, for example at 715, additional vertices/triangles may be added to the 3D mesh 700 as compared to 3D mesh 400.

Figure 8:
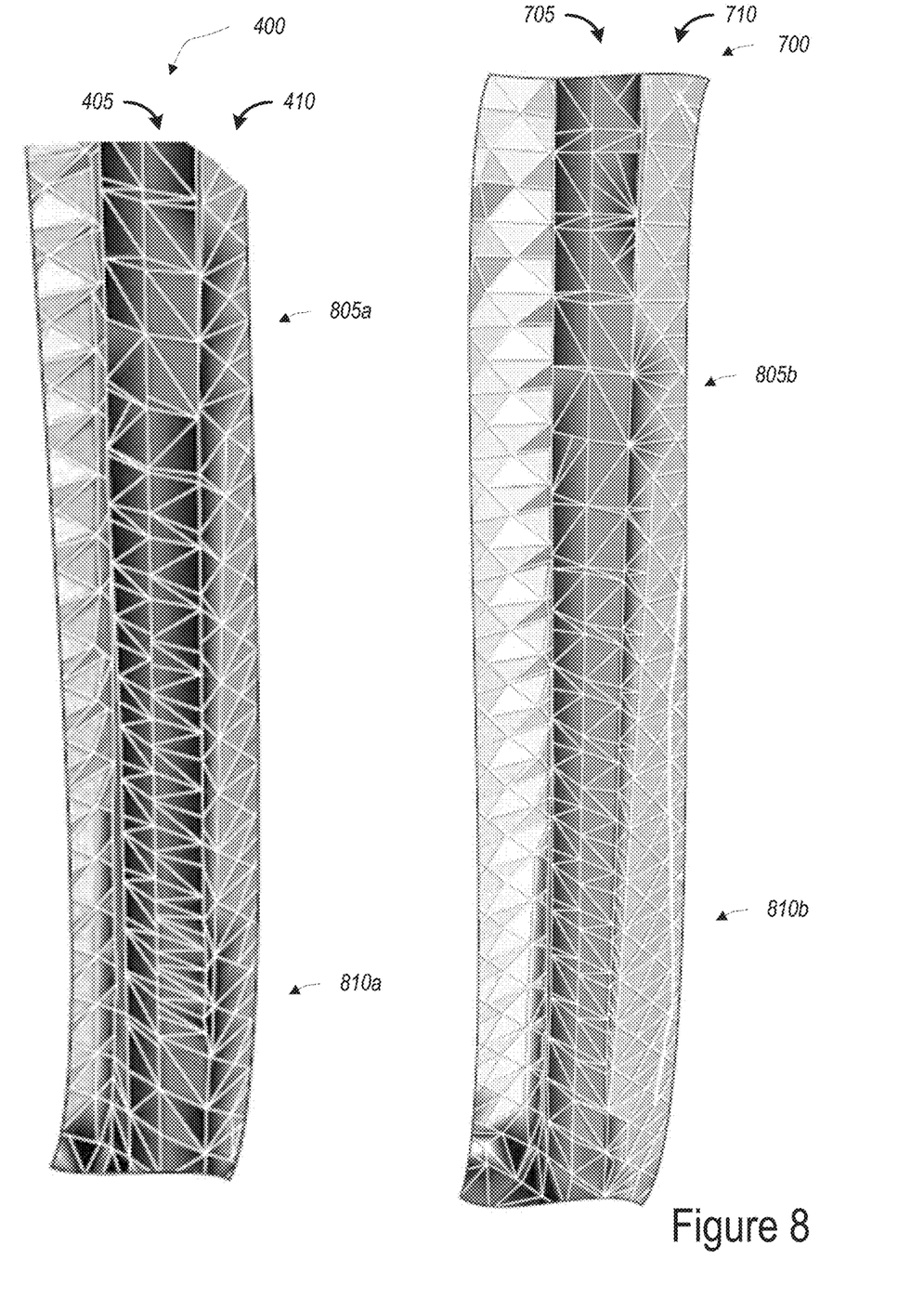
FIG. 8 depicts a comparison of two example images of a 3D mesh related to the 3D space, according to various embodiments.

FIG. 8 depicts a comparison between the 3D mesh 400 and the 3D mesh 700. As may be seen, the number of dark-shaded triangles in the 3D mesh 700 is significantly less than the number of dark-shaded triangles in the 3D mesh 400. Specifically, as may be seen, the section 805a in 3D mesh 400 may generally correspond to the section 805b in 3D mesh 700. As may be seen, the 3D mesh 700 may include significantly more triangles at 805b as a result of the above-described process. The triangles at 805b may serve to more clearly define the border between the planar surfaces 705/710 than the border between surfaces 405/410 at 805a. Similarly, sections 810a and 810b may correspond to one another. As can be seen, the 3D mesh 700 at 810b may include more triangles than the 3D mesh 400 at 810a. The additional triangles at 810b may more clearly define the border between planar surfaces 705/710 than the border between planar surfaces 405/410 at 810a.

Figure 9:
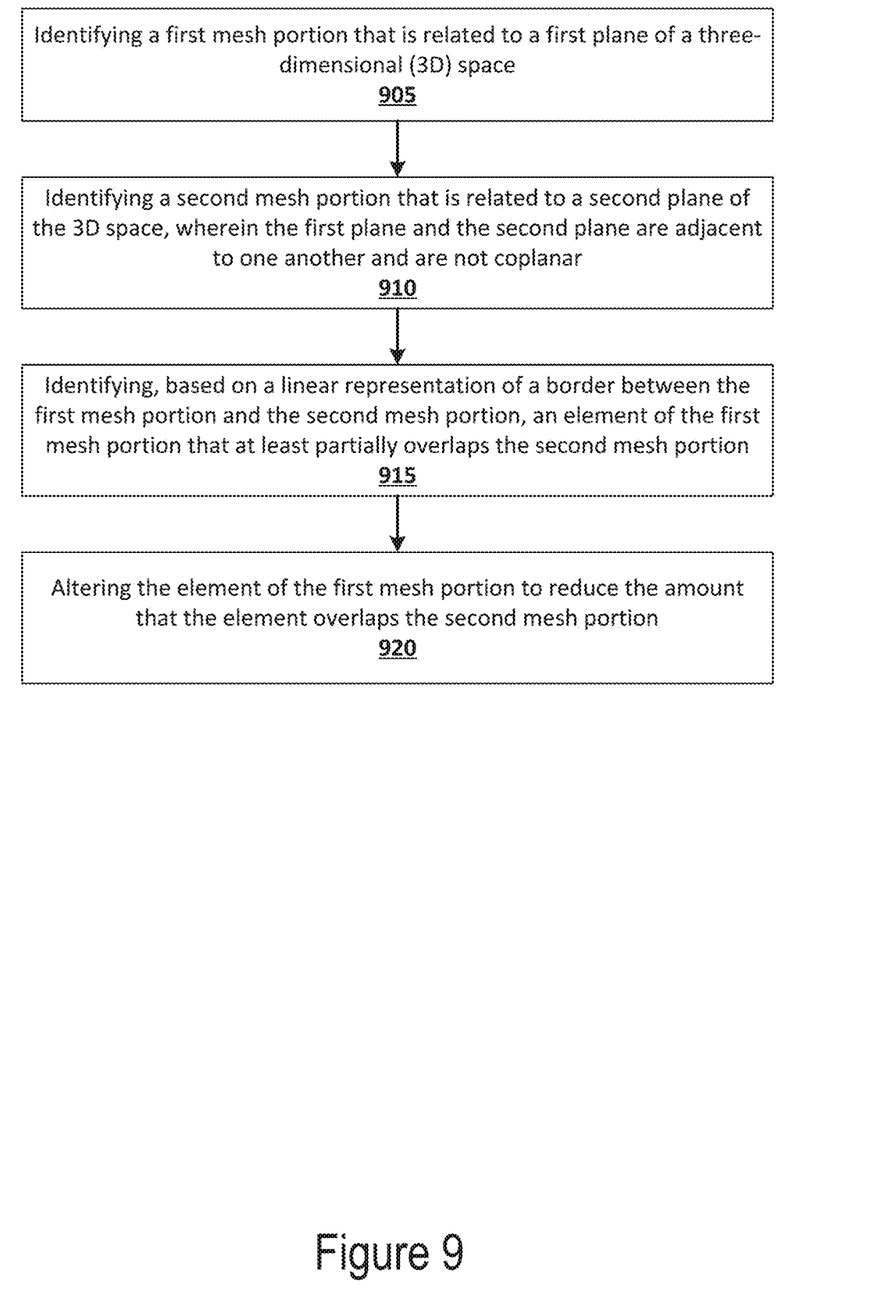
FIG. 9 depicts an example process related to surface partitioning with plane and line constraints, in accordance with various embodiments.

FIG. 9 depicts an example process related to surface partitioning with plane and line constraints, in accordance with various embodiments. Such a process may be performed, for example, by surface partition logic as described above.

The technique may include identifying, at 905, a first mesh portion that is related to a first plane of a 3D space. The technique may further include identifying, at 910, a second mesh portion that is related to a second plane of the 3D space. The first plane and the second plane may be adjacent to one another, and may be non-coplanar. The portions may be, for example, the planar surfaces 405 and 410, as described above. It will be noted that, in some embodiments, the first and second mesh portions may be coplanar. However, for the sake of discussions herein, the technique of FIG. 9 may be described as non-coplanar.

The technique of FIG. 9 may further include identifying, at 915 based on a linear representation of a border between the first mesh portion and the second mesh portion, an element of the first mesh portion that at least partially overlaps the second mesh portion. Such an element may be, for example, a triangle of the 3D mesh as described above with respect to FIG. 5. The linear representation may be, for example, the linear representation that is depicted and described with respect to dots 505. As noted above, the linear representation may be based on a 2D image of the 3D space and/or a RGB image of the 3D space. An example of such a representation may be as depicted or described with respect to FIG. 2 or 3, and may be based on line 320, as described above.

The technique may further include altering, at 920, the element of the first mesh portion to reduce the amount that the element overlaps the second mesh portion. Such alteration may be as described with respect to FIGS. 6-8. Specifically, the alteration may include sub-dividing the triangle (i.e., the "element") into two or more triangles (or "sub-elements") of the 3D mesh. Such sub-dividing may be performed by introducing additional vertices such as is described with respect to dots 605.

It will be understood that this description is intended as a high-level example description of one technique that may be performed, for example by surface partition logic. It will be understood that other embodiments may include more or fewer elements, elements arranged in a different order, etc.

Figure 10:
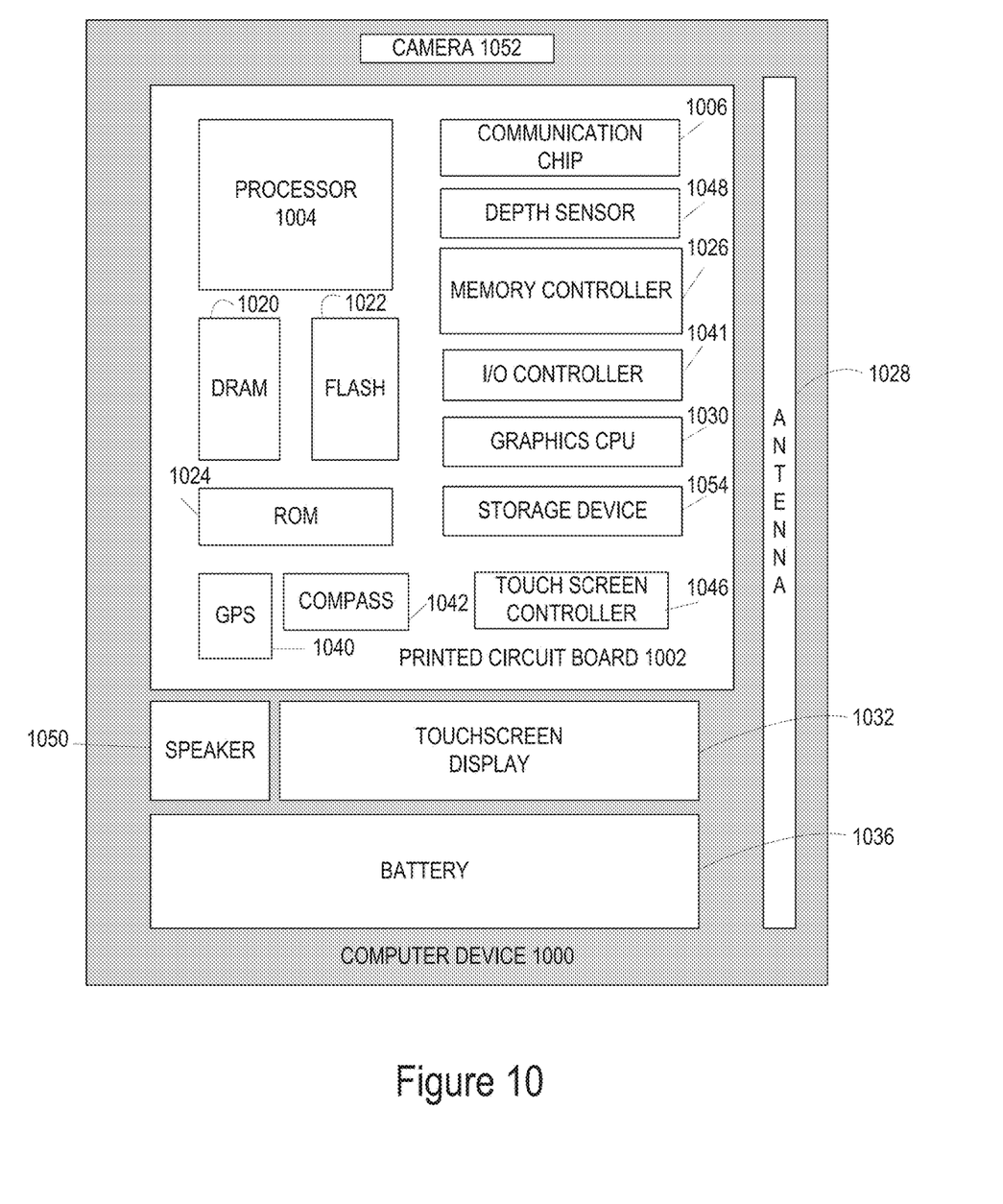
FIG. 10 is a block diagram of an example computer that can be used to implement some or all of the components of the disclosed systems and methods, according to various embodiments.

FIG. 10 illustrates an example computer device 1000 that may be employed by the apparatuses and/or methods described herein, in accordance with various embodiments. The computer device 1000 may include surface partition logic, as described above. In some embodiments, the computer device 1000 may include one or more elements of surface partition logic. In some embodiments, the surface partition logic may include or be implemented as hardware, software, firmware, or some combination thereof. For example, the surface partition logic may be a part of, or implemented by, processor 1004 of computer device 100.

As shown, computer device 1000 may include a number of components, such as one or more processor(s) 1004 (one shown) and at least one communication chip 1006. In various embodiments, one or more processor(s) 1004 each may include one or more processor cores. In various embodiments, the one or more processor(s) 1004 may include hardware accelerators to complement the one or more processor cores. In various embodiments, the at least one communication chip 1006 may be physically and electrically coupled to the one or more processor(s) 1004. In further implementations, the communication chip 1006 may be part of the one or more processor(s) 1004. In various embodiments, computer device 1000 may include printed circuit board (PCB) 1002. For these embodiments, the one or more processor(s) 1004 and communication chip 1006 may be disposed thereon. In alternate embodiments, the various components may be coupled without the employment of PCB 1002.

Depending on its applications, computer device 1000 may include other components that may be physically and electrically coupled to the PCB 1002. These other components may include, but are not limited to, memory controller 1026, volatile memory (e.g., dynamic random access memory (DRAM) 1020), non-volatile memory such as read only memory (ROM) 1024, flash memory 1022, storage device 1054 (e.g., a hard-disk drive (HDD)), an I/O controller 1041, a digital signal processor (not shown), a crypto processor (not shown), a graphics processor 1030, one or more antennae 1028, a display, a touch screen display 1032, a touch screen controller 1046, a battery 1036, an audio codec (not shown), a video codec (not shown), a global positioning system (GPS) device 1040, a compass 1042, an accelerometer (not shown), a gyroscope (not shown), a depth sensor 1048, a speaker 1050, a camera 1052, and a mass storage device (such as hard disk drive, a solid state drive, compact disk (CD), digital versatile disk (DVD)) (not shown), and so forth.

In some embodiments, the one or more processor(s) 1004, flash memory 1022, and/or storage device 1054 may include associated firmware (not shown) storing programming instructions configured to enable computer device 1000, in response to execution of the programming instructions by one or more processor(s) 1004, to practice all or selected aspects of any of the process flows, interface, or techniques described with respect to FIGS. 1-9, herein. In various embodiments, these aspects may additionally or alternatively be implemented using hardware separate from the one or more processor(s) 1004, flash memory 1022, or storage device 1054.

The communication chips 1006 may enable wired and/or wireless communications for the transfer of data to and from the computer device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, 6G, 7G, and beyond. The computer device 1000 may include a plurality of communication chips 1006. For instance, a first communication chip 1006 may be dedicated to shorter range wireless communications such as Wi-Fi and Bluetooth, and a second communication chip 1006 may be dedicated to longer range wireless communications such as GPS, EDGE, GPRS, CDMA, WiMAX, LTE, Ev-DO, and others.

In various implementations, the computer device 1000 may be a laptop, a netbook, a notebook, an ultrabook, a smartphone, a computer tablet, a personal digital assistant (PDA), a desktop computer, smart glasses, or a server. In further implementations, the computer device 1000 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 11:
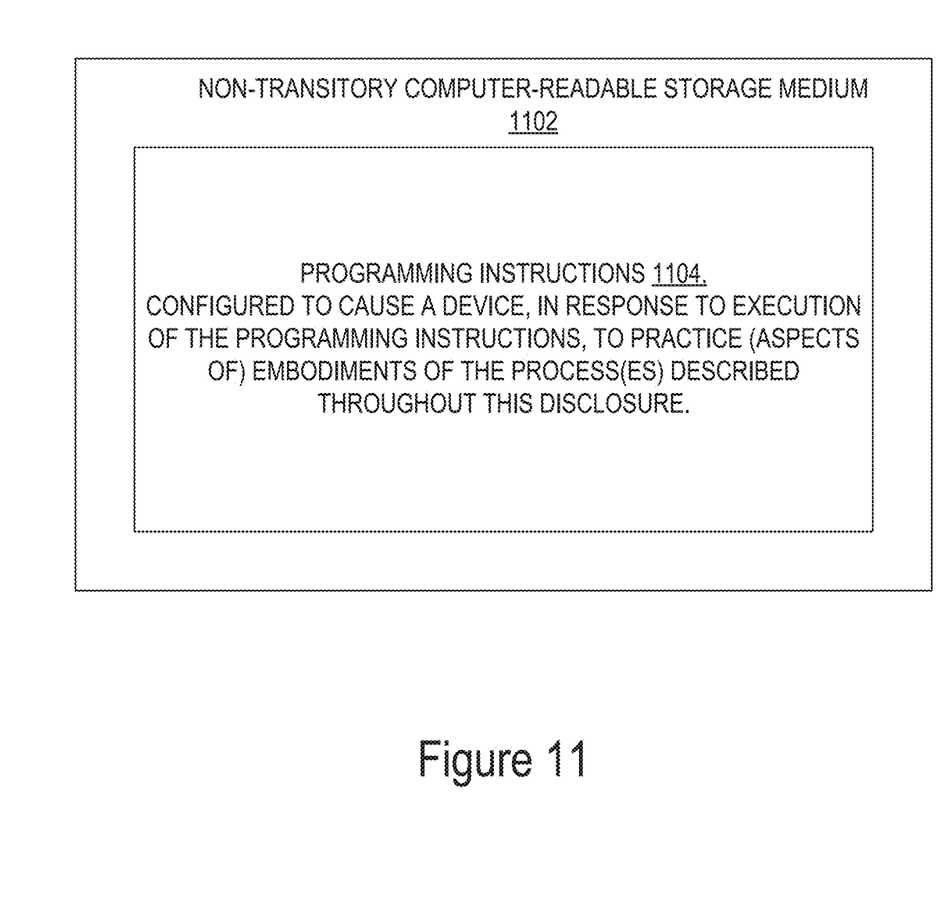
FIG. 11 is a block diagram of a computer-readable storage medium that can be used to implement some of the components of the system or methods disclosed herein, according to various embodiments.

FIG. 11 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1102 may include a number of programming instructions 1104. Programming instructions 1104 may be configured to enable a device, e.g., computer 1000, in response to execution of the programming instructions, to implement (aspects of) any of the techniques, methods, process flows, or interfaces described with respect to any of FIGS. 1-9, herein. In alternate embodiments, programming instructions 1104 may be disposed on multiple computer-readable non-transitory storage media 1102 instead. In still other embodiments, programming instructions 1104 may be disposed on computer-readable transitory storage media 1102, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. One or more non-transitory computer-readable media comprising instructions that, upon execution of the instructions by one or more processors of an electronic device, are to cause the electronic device to:
   identify a first mesh portion that is related to a first plane of a three-dimensional (3D) space;
   identify a second mesh portion that is related to a second plane of the 3D space, wherein the first plane and the second plane are adjacent to one another and are not coplanar;
   identify, based on a linear representation of a border between the first mesh portion and the second mesh portion, an element of the first mesh portion that at least partially overlaps the second mesh portion; and
   alter the element of the first mesh portion to reduce the amount that the element overlaps the second mesh portion;

wherein altering the element of the first mesh portion includes sub-dividing the element into two or more elements of a 3D mesh.

2. The one or more non-transitory computer-readable media of claim 1, wherein the first and second mesh portions are based on an image of the 3D space taken by a camera.

3. The one or more non-transitory computer-readable media of claim 2, wherein the first and second mesh portions are further based on depth data of the 3D space associated with the image.

4. The one or more non-transitory computer-readable media of claim 2, wherein the linear representation is based on the image of the 3D space.

5. The one or more non-transitory computer-readable media of claim 4, wherein the image is a two-dimensional (2D) image of the 3D space.

6. The one or more non-transitory computer-readable media of claim 4, wherein the image is a red-green-blue (RGB) image of the 3D space.

7. The one or more non-transitory computer-readable media of claim 1, wherein the element of the first mesh portion is a triangle of the 3D mesh.

8. The one or more non-transitory computer-readable media of claim 1, wherein the first mesh portion is a planar surface of the 3D mesh.

9. An electronic device comprising:
   surface partition logic; and
   one or more non-transitory computer-readable media comprising instructions that, upon execution of the instructions, are to cause the surface partition logic to:
   identify a first mesh portion that is related to a first plane of a three-dimensional (3D) space;
   identify a second mesh portion that is related to a second plane of the 3D space, wherein the first plane and the second plane are adjacent to one another and are not coplanar;
   identify, based on a linear representation of a border between the first mesh portion and the second mesh portion, an element of the first mesh portion that at least partially overlaps the second mesh portion; and
   alter the element of the first mesh portion to reduce the amount that the element overlaps the second mesh portion;
   wherein altering the element of the first mesh portion includes sub-dividing the element into two or more elements of a 3D mesh.

10. The electronic device of claim 9, wherein the first and second mesh portions are based on an image of the 3D space taken by a camera.

11. The electronic device of claim 10, wherein the first and second mesh portions are further based on depth data of the 3D space associated with the image.

12. The electronic device of claim 10, wherein the linear representation is based on the image of the 3D space.

13. The electronic device of claim 9, wherein the element of the first mesh portion is a triangle of the 3D mesh.

14. The electronic device of claim 9, wherein the first mesh portion is a planar surface of the 3D mesh.

15. A method to be performed by an electronic device, wherein the method comprises:
   identifying a first mesh portion that is related to a first plane of a three-dimensional (3D) space;
   identifying a second mesh portion that is related to a second plane of the 3D space, wherein the first plane and the second plane are adjacent to one another and are not coplanar;
   identifying, based on a linear representation of a border between the first mesh portion and the second mesh portion, an element of the first mesh portion that at least partially overlaps the second mesh portion; and
   altering the element of the first mesh portion to reduce the amount that the element overlaps the second mesh portion;
   wherein altering the element of the first mesh portion includes sub-dividing the element into two or more elements of a 3D mesh.

16. The method of claim 15, wherein the first and second mesh portions are based on an image of the 3D space taken by a camera.

17. The method of claim 15, wherein the element of the first mesh portion is a triangle of the 3D mesh.

18. The method of claim 15, wherein the first mesh portion is a planar surface of the 3D mesh.

\* \* \* \* \*